Sept. 9, 1969  E. H. TURNER  3,466,121

NONRECIPROCAL OPTICAL DEVICES

Filed Sept. 28, 1965  2 Sheets-Sheet 1

INVENTOR
E. H. TURNER
BY Kenneth W. Mateer
ATTORNEY

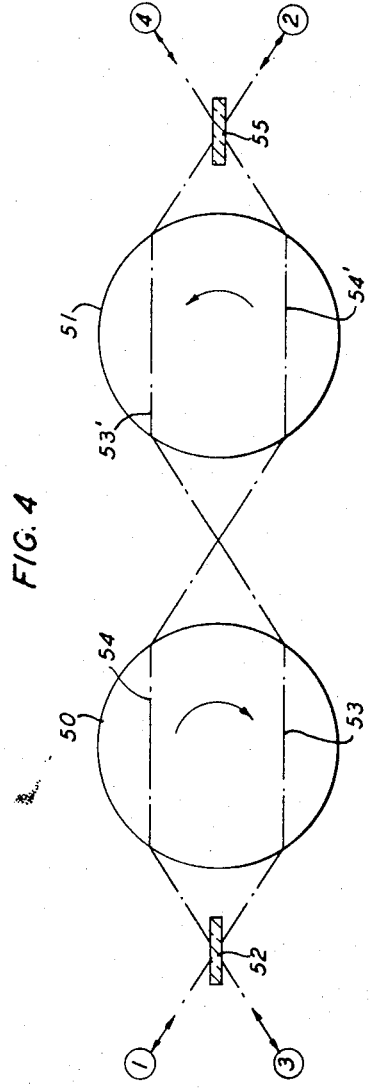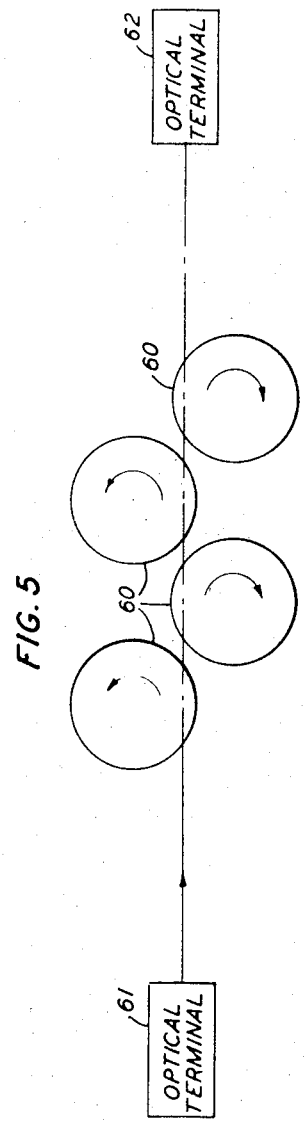

United States Patent Office 3,466,121
Patented Sept. 9, 1969

3,466,121
NONRECIPROCAL OPTICAL DEVICES
Edward H. Turner, Rumson, N.J., assignor to Bell Telephone Laboratories, Incorporated, New York, N.Y., a corporation of New York
Filed Sept. 28, 1965, Ser. No. 490,958
Int. Cl. G02b 17/08
U.S. Cl. 350—321                                6 Claims

ABSTRACT OF THE DISCLOSURE

This application describes optical gyrators and circulators. In accordance with the disclosure, light is transmitted through a moving medium, the velocity of which affects the velocity of propagation of the light in accordance with the Fresnel drag effect. Depending upon the relative directions of the light and the moving medium, the phase shift of the light is either advanced or retarded. In one class of devices a moving fluid is used. In a second class of devices rotating discs are employed.

---

Figure 1:
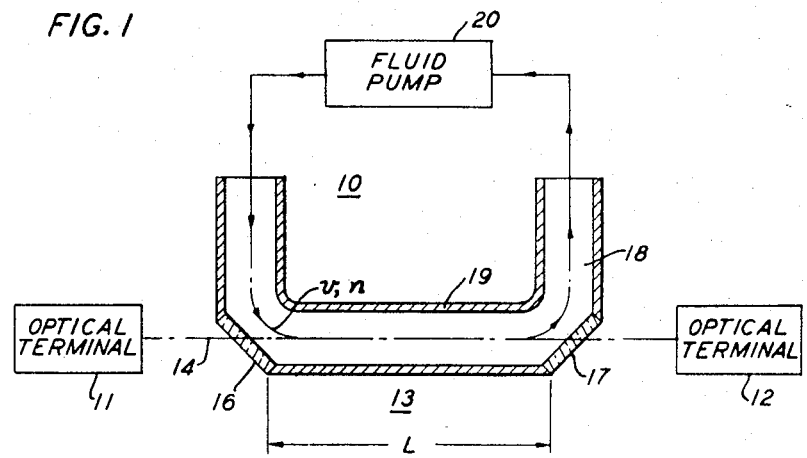

This invention relates to optical frequency electromagnetic wave energy transmission apparatus and, more particularly, to nonreciprocal components such as gyrators and circulators.

The concept of nonreciprocal transmission among two or more wave energy paths is priorly disclosed, for example, in an article entitled "The Behavior and Applications of Ferrites in the Microwave Region" by A. G. Fox, S. E. Miller, and M. T. Weiss, which appears at pages 5–103 of the Bell System Technical Journal, January 1955. The recent advent of sources of coherent, substantially monochromatic wave energy at optical frequencies has now stimulated the advance of the communications industry in that higher frequency range. For example, modulated optical frequency energy beams offer the possibility of extremely broadband communication channels for use in a light communication system. However, many of the system components heretofore available at the prior art microwave frequencies are not adaptable to the higher frequency optical or near optical systems since the propagation of energy in the frequency range from the far infrared, through visible, and into the ultraviolet is governed by optical rather than by microwave considerations.

One such component is the gyrator, in which electromagnetic wave energy propagating in a first direction therethrough experiences a given phase shift, while energy propagating in a second direction therethrough which is opposite to said first direction experiences a phase shift 180 degrees different from said given phase shift. A second such component is the circulator, in which energy applied at a first port appears at a second port, but energy applied at the second port appears, not at the first port, but at a third port.

It is therefore an object of the present invention to extend certain nonreciprocal device principles into the optical frequency range.

As disclosed in the copending application of J. F. Dillon, Jr., Ser. No. 249,173, now Patent No. 3,267,804, filed Jan. 3, 1963, and assigned to the assignee of this application, some magnetically controlled optical circulator arrangements are known. The most efficient of such devices require, in addition to an applied magnetic field, very low operating temperatures. Such external magnetic fields and cryogenic environments are oftentimes undesirably bulky and difficult to provide.

It is therefore a further object of the present invention to manipulate light waves nonreciprocally in devices which operate at room temperature and which do not require magnetic control.

In accordance with the invention, electromagnetic wave energy to be nonreciprocally manipulated is transmitted through a medium which is itself moving with a given velocity in a given direction. The velocity of the light in the medium is dependent upon the velocity of the medium and the light velocity is therefore different in opposite transmission directions. Accordingly, nonreciprocal transmission can be effected.

In a first illustrative embodiment, a light beam is directed into and through a conduit containing a fluid of given index of refraction moving with a given velocity in a direction parallel to the axis of beam propagation.

In a second illustrative embodiment, a light beam is directed into and through a portion of a disc of transparent solid material rotating at a given velocity. Additional species of this embodiment involve plural beam paths through a single rotating disc, and both single and plural beam paths through a plurality of rotating discs.

The above and other objects of the invention, together with its various features and advantages, will become more readily apparent upon consideration of the accompanying drawing and the detailed description thereof which follows.

Figure 2:
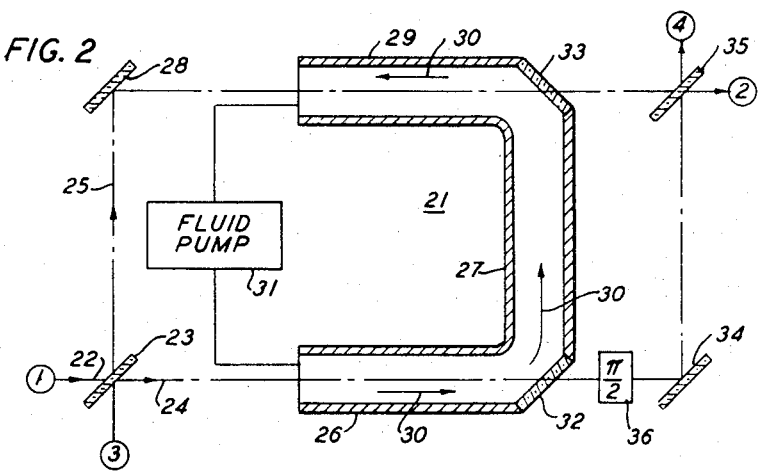
Figure 3:
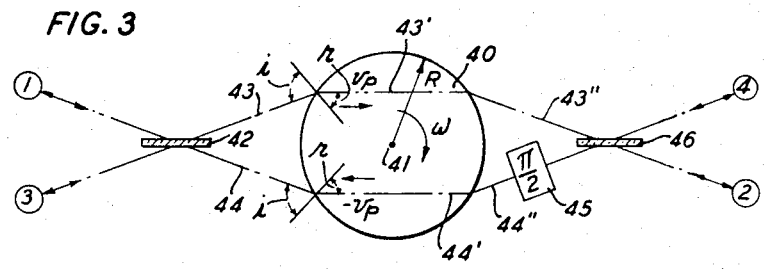

In the drawing:
FIG. 1 is a schematic view of a fluid optical gyrator in accordance with the invention;
FIG. 2 is a schematic view of an optical circulator based on the gyrator of FIG. 1;
FIG. 3 is a schematic view of a solid optical circulator in accordance with the invention; and
FIGS. 4 and 5 are schematic views of other nonreciprocal solid optical devices.

Referring now more particularly to the drawing, FIG. 1 illustrates an optical gyrator 10 in accordance with the invention comprising a first optical terminal 11, a second optical terminal 12, and nonreciprocal optical phase shifter 13. Optical terminal 11, which can be a laser source, provides an optical beam for propagation along axis 14, through transparent Brewster angle windows 16, 17 in the walls of conduit 19 and, ultimately, to terminal 12, which can be an optical receiver or an optical amplifier. Conduit 19 is filled with a fluid medium 18 of index of refraction $n$ which is moving with a velocity $v$ in a direction between windows 16, 17 parallel to axis 14. In FIG. 1, the fluid in conduit 19 moves counterclockwise, and the motion is maintained by fluid pump 20 which is schematically shown in series with the conduit.

Gyrator action is realized in the embodiment of FIG. 1 when the phase shift experienced by light waves traveling in opposite directions therethrough differs by 180 degrees. In general, the velocity of light $c'$ in a medium of index of refraction $n$ is equal to $c/n$ where $c$ is the velocity of light in free space. When, however, the medium itself is moving with a velocity $v$, several correction terms enter the velocity expression. First, there is a Fresnel drag coefficient (or, alternatively, the Fizeau entrainment coefficient) which is equal to $$\left(1-\frac{1}{n^2}\right)$$

In addition, there is a correction for dispersion originally predicted by H. A. Lorentz and demonstrated by P. Zeeman, equal to $$\frac{\omega}{n}\frac{dn}{d\omega}$$

where $\omega$ is the angular frequency of the energy in the optical beam. Thus the velocity of a light beam in a moving medium becomes $$\frac{c}{n}\pm v\left(1-\frac{1}{n^2}+\frac{\omega}{n}\frac{dn}{d\omega}\right) \quad (1)$$

The velocity dependent change in apparent index of refraction, $\Delta n$, termed for the purposes of the present specification as the Fresnel drag correction, is therefore $$\Delta n = \pm \frac{v}{c}\left(n^2 - 1 + n\omega \frac{dn}{d\omega}\right) \quad (2)$$

The phase shift $\varphi$ introduced to a beam propagation along a transmission path of length L is $$L\frac{\omega n}{c}$$

which, for the device shown in FIG. 1, becomes $$L\frac{\omega}{c}(n \pm \Delta n)$$

For gyrator action, the round-trip phase shift must equal 180 degrees or, mathematically $$\phi = L\frac{\omega}{c}(n+|\Delta n|) - L\frac{\omega}{c}(n-|\Delta n|) = \pi$$

Simplifying, $$2L\frac{\omega}{c}|\Delta n| = \pi$$

and $$L|\Delta n| = \frac{\pi c}{2\omega} = \frac{\lambda}{4} \quad (3)$$

By calculating $\Delta n$ from Equation 2 and substituting in 3, the required length L for a fluid gyrator in accordance with the invention can be determined.

For increased efficiency, it may be desirable to divide the light beam entering the gyrator into two portions, one of which experiences a positive relative phase retardation and the other of which experiences a negative relative phase retardation. The increased efficiency comes from the fact that a single medium moving under the influence of a single driving source is effectively used twice. In such an arrangement, the relative phase shift per beam portion need only be one-half that of a single beam, single pass device. With the phase shift thus halved, the requirement for nonreciprocal Fresnel drag correction devices becomes $$Lv = \frac{\lambda c}{8\left(n^2 - 1 + n\omega \frac{dn}{d\omega}\right)} \quad (4)$$

At $\lambda = 0.63\mu$, a typical optical maser output frequency, $$Lv = \frac{24}{\left(n^2 - 1 + n\omega \frac{dn}{d\omega}\right)} \quad (5)$$

From Equation 5, it can be seen that practical nonreciprocal Fresnel drag correction devices require media with large velocity $v$, high index of refraction $n$, large normal dispersion $dn/d\omega$, and, of course, low optical loss.

A Fresnel drag correction circulator 21 is shown in FIG. 2, in which the half gyrator principles discussed hereinbefore are utilized. In FIG. 2, a light beam from port 1 is directed along axis 22 and is incident upon semi-transparent mirror 23 which can comprise a half silvered dielectric plate of well-known construction. Typically, one-half of the incident energy is transmitted by mirror 23 along beam path 24, and one-half is reflected by the mirror along beam path 25. The beam portion on path 24 proceeds directly to arm 26 of gyrator 27 while the beam portion on path 25 proceeds to totally reflecting mirror 28 at which it is reflected into arm 29 of the gyrator.

As in FIG. 1, a fluid medium of refractive index $n$ flows in a given direction, indicated by arrows 30 to be counterclockwise, within gyrator 27 with a velocity $v$ maintained by fluid pump 31.

The separate beam portions then proceed through the two gyrator arms 26, 29 in which the fluid moves in opposite but parallel directions. When the complete arm has been traversed, the beams exit through transparent Brewster angle output windows 32, 33, the beam portion from window 32 traveling toward reflector 34 from which it is reflected upward toward optical hybrid 35, and the beam portion from window 33 proceeding directly to the hybrid. Hybrid 35 is similar to beam splitter 23 and the phases of the incident waves determine the port at which an output appears. When the path lengths between mirrors 23 and 35 are equal or differ by an integral number of wavelengths, the waves recombine at mirror 35 with a resultant output wave emerging at port 2. When the fluid within the gyrator is in motion, the path including arm 29 is increased in phase length while the path including arm 26 is decreased in phase length. A typical phase change per arm is $\pi/4$ radian, necessitating a $\pi/2$ radian phase addition, indicated by box 36, in the lower path to effect output at port 2. This constant phase shift addition can be accomplished by an adjustment of mirror 34. Alternatively, a $\pi/2$ radian phase lag can be introduced in the other beam path.

For propagation between other ports, a wave launched at port 2 experiences a decreased phase length of $\pi/4$ radian in the path containing arm 29 and an increased phase length $(\pi/4 + \pi/2)$ radians in the path containing arm 26. Thus the two wave portions split at mirror 35 arrive at mirror 23 with a 180-degree phase difference and combine to emerge at port 3. Similarly, an optical wave applied at port 3 will emerge at port 4, and energy applied at port 4 exits at port 1. Thus, four-port circulator action is realizable.

In a practical embodiment of the invention, carbon disulfide, with an index of refraction of 1.64, can be used as the moving fluid. From Equations 2 and 3 the required length L is 1.6 meters, assuming a flow velocity of 8 meters per second.

The invention can also be practiced with solid media. In FIG. 3, such an optical circulator is depicted comprising rotating disc 40 of quartz, glass, or gallium phosphide, for example. Since solids typically have higher indices of refraction, and can be moved with higher velocities than fluids, the Fresnel drag coefficient effect is more marked, and the resultant nonreciprocal devices are more readily realized with a smaller volume of moving material.

In FIG. 3, disc 40 is illustrated as rotating in a clockwise direction about central axis 41, with incident light being divided into first and second portions in order that the principles of the half gyrator, discussed hereinbefore with respect to FIG. 2, can be employed. A beam incident at port 1 from an optical source, not shown, is divided at semireflecting mirror 42 into two portions designated as beam portions 43, 44. Each of the resulting beam portions is incident upon disc 40 at an angle $i$ selected with respect to the characteristics of dielectric interface between disc 40 and its surrounding medium such that the paths 43′, 44′ within the disc are both equal in length and parallel. The Fresnel drag correction experienced by the propagating wave introduces a positive phase differential of $\pi/2$ radians between paths 44′ and 43′. The $\pi/2$ radian phase delay 45 in path 44″ is necessary to permit recombination of the wave portions at mirror 36 as an output at port 2. The phase relations for propagation between ports 2–3, 3–4, and 4–1 are similar to those set out with respect to FIG. 2.

With disc 40 immersed in air or other medium of refractive index substantially equal to unity, the angle of internal refraction, designated $r$ in FIG. 3, is limited by total internal reflection principles to values for which $\sin r < 1/n$ where $n$ is the index of refraction of the disc material. Within a disc rotating at angular velocity $\omega$, the beam paths 43′, 44′ are affected by a velocity component parallel to their axis of propagation of $+v_p$, $-v_p$, respectively. The path length, L, over which the beam portion travels within the disc 40 is related to the angular velocity $\omega$, the disc radius R, and the angle of refraction $r$ by the expression $$Lv_p = \omega R^2 \sin(2r)$$

In a practical case, $r$ should be as large as possible for most efficient results. By selecting the angle of refraction in accordance with the Brewster angle condition of incidence, $\tan r = 1/n$, and $$\sin r = \frac{1}{\sqrt{1+n^2}}$$

which, for $n$ fairly large, approaches the limit set out before from total internal reflection considerations. Operation at the Brewster angle is very nearly the most desirable operating condition when the disc is not immersed in an index matching fluid. A typical path length L, given by $2R \cos r$, is 20 centimeters in a disc of radius 11.5 centimeters comprising, for example, a dense flint glass with an index of refraction 1.9. Such a disc requires rotation at an angular velocity of 5270 revolutions per minute.

FIG. 4 is a modification of the solid disc embodiment of FIG. 3 in which any errors due to slightly diverging ray paths are compensated. A first disc 50 and a second disc 51, identical to the first, rotate with equal angular velocities in opposite rotational senses. A light beam incident upon semireflecting mirror 52 is split thereby into first and second beam portions which traverse disc 50 and then disc 51, beam portion 53 in the first medium becoming beam portion 53' in the second medium, with beam portions 54, 54' being similarly related. The associated angles of incidence and refraction are governed in accordance with the principles set out with reference to FIG. 3. As can be appreciated, a ray divergence in beam portion 53, for example, results in the lowermost rays experiencing a shorter traversal of the Fresnel drag region than the uppermost rays. When, however, the ray paths cross between discs 50 and 51, the relative positions of the diverging rays within the beam portion 53' are reversed, and the total path lengths are therefore equalized at the output. The beam portions 53', 54' are recombined at semitransparent mirror 55 and appear at port 2 for a $\pi/4$ phase change per traversal of the solid medium. The circulation of signals between ports 2, 3, 4, and 1 proceeds as previously set out. When $\pi/8$ radian phase changes are introduced at each traversal of the medium, a reciprocal $\pi/2$ radian phase addition is required as before.

In FIG. 5, a gyrator comprising a plurality of discs 60 rotating in a single sense is depicted. The cumulative phase change effect of each of discs 60 is additive, and adjustments of the phase shift introduced to a beam propagating between optical terminals 61, 62 can be easily made by a variable drive speed adjust associated with a single one of the discs.

In all cases, it is understood that the above-described arrangements are only illustrative of the principles of the present invention. Numerous and varied other embodiments can be devised by those skilled in the art without departing from the spirit and scope of the invention. For example, moving gaseous media can be used to impart a Fresnel drag correction to a propagating light beam, although the indices of refraction of gaseous media are generally lower than those of available solid and liquid media.

What is claimed is:

1. An optical gyrator comprising:
   first and second wavepaths, each of which includes a moving medium whose direction of motion is opposite to the direction of motion in the other of said wavepaths;
   means disposed along at least one of said wavepaths for introducing $\pi/2$ radians of reciprocal relative phase shift between wavepaths;
   means for dividing an incident coherent optical beam into two equal components and for directing each of said components into one end of a different one of said wavepaths;
   means disposed at the other end of said wavepaths for recombining said two beam components;
   characterized in that the total differential phase shift between wavepaths is equal to $m\pi$ radians where $m$ is an odd integer for one direction of propagation and an even integer for the reverse direction of propagation.

2. The circulator according to claim 1 in which said dividing and recombining means comprise semitransparent mirrors.

3. The circulator according to claim 1 in which said moving medium is a fluid in a U-shaped conduit, and said first and second paths are the separate parallel arms of the U.

4. The circulator according to claim 1 in which said moving medium is a single solid disc rotating about a central axis with a given rotational sense and said first and second paths are parallel chords equidistant from the axis of rotation.

5. In combination with the circulator according to claim 4, a second solid disc rotating with the opposite sense to that of said single solid disc,
   said first and second beam components traversing said second disc in sequence after said given disc along parallel chords equidistant from the axis of rotation.

6. A gyrator comprising:
   at least one solid medium, transparent to electromagnetic wave energy at an optical frequency $\omega$, rotating about a given axis;
   said medium having an index of refraction $n$ and an angular velocity such as to produce a velocity component $v$ along a path through said medium;
   means for applying coherent wave energy at said optical frequency to said medium for propagation along said path;
   and means for receiving said wave energy after traversing said path;
   characterized in that the length L of said path is such that the differential phase shift, $\varphi$, experienced by wave energy in traversing said path in opposite directions is equal to $\pi$ radians, where $$\varphi = 2L\frac{\omega}{c}|\Delta n|$$

$\Delta n$ is the Fresnel drag correction term expressed as $$\Delta n = \frac{v}{c}\left(n^2 - 1 + n\frac{dn}{d\omega}\right)$$

and $c$ is the free space velocity of light.

References Cited

UNITED STATES PATENTS 3,267,804   8/1966   Dillon _____ 350—151

OTHER REFERENCES

Davis et al., "Electromagnetic Angular Rotation Sensing," Aeronautical Systems Division, U.S.A.F., Wright-Patterson Air Force Base, Ohio, Electro-Optics Group, Sperry Gyroscope Co., Division of Sperry Rand Corp., Great Neck, N.Y., Sperry Report No. AB–1108–0016–1, Apr. 22, 1964, Found in Gp. 257, p. 5–1–5–11.

Macek et al., "Measurement of Fresnel Drag With the Ring Laser," Journal of Appl. Phys., vol. 35, 1964, pp. 2556–2557.

Jenkins and White, "Fundamentals of Optics," third edition, McGraw-Hill Book Company, Inc., 1957, pp. 396–397.

DAVID SCHONBERG, Primary Examiner

T. H. KUSMER, Assistant Examiner

U.S. Cl. X.R.

333—24.1, 98; 356—106